US012730876B2

(12) United States Patent
Shachar et al.

(10) Patent No.: US 12,730,876 B2
(45) Date of Patent: Sep. 8, 2026

(54) DEVICE PROTECTION USING PRE-EXECUTION COMMAND INTERCEPTION AND EVALUATION

(71) Applicant: Dell Products L.P., Round Rock, TX (US)

(72) Inventors: Tomer Shachar, Beer Sheva (IL); Maxim Balin, Gan-Yavne (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 627 days.

(21) Appl. No.: 17/958,844

(22) Filed: Oct. 3, 2022

(65) Prior Publication Data

US 2024/0111855 A1 Apr. 4, 2024

(51) Int. Cl.
*G06F 21/44* (2013.01)

(52) U.S. Cl.
CPC .................................. *G06F 21/445* (2013.01)

(58) Field of Classification Search
CPC ...... G06F 21/445; G06F 21/31; G06F 21/575; G06F 21/629; G06F 21/71
See application file for complete search history.

(56) References Cited

U.S. PATENT DOCUMENTS 7,293,281 B1 * 11/2007 Moran .................. H04L 63/101 705/52
7,784,088 B2 * 8/2010 Darbha ................ H04N 21/422 726/8
10,063,537 B2 8/2018 Zhu
11,336,438 B2 * 5/2022 Atzmony .............. H04L 9/3213
2006/0130144 A1 * 6/2006 Wernicke ................ G06F 21/56 726/24
2007/0240212 A1 * 10/2007 Matalytski ............ G06F 21/552 726/22
2008/0177994 A1 * 7/2008 Mayer ..................... G06F 16/00 709/224
2009/0205050 A1 * 8/2009 Giordano ................ G06F 21/71 711/159

(Continued)

OTHER PUBLICATIONS

Depuy, Travis; "Adding Approval Jobs to your CI Pipeline"; published Oct. 2, 2020; hhttps://circleci.com/blog/adding-approval-jobs-to-your-ci-pipeline/; downloaded on Sep. 17, 2022.

*Primary Examiner* — Lizbeth Torres-Diaz
(74) *Attorney, Agent, or Firm* — Ryan, Mason & Lewis, LLP

(57) ABSTRACT

Techniques are provided for device protection using pre-execution command interception and evaluation. One method comprises obtaining, by a software entity associated with an operating system kernel of a device, a command from a user prior to an execution of the command; providing, by the software entity associated with the operating system kernel, a request to an approval entity to evaluate whether to execute the command; and initiating the execution of the command based on a result of the evaluation, by the approval entity, of whether to execute the command. The approval entity may be identified by accessing a registry of one or more users that are authorized to provide an authorization to execute the command. The evaluation of whether to execute the command may comprise one or more tasks specified by a policy.

20 Claims, 8 Drawing Sheets

(56) References Cited

U.S. PATENT DOCUMENTS

2010/0293614 A1* 11/2010 Vilppola ................. G06F 21/52
726/22
2012/0192275 A1* 7/2012 Oliver ..................... G06F 21/51
726/24
2016/0132670 A1* 5/2016 Salama ................ G06V 40/172
726/19
2017/0085591 A1* 3/2017 Ganda ................... H04W 12/08
2018/0041510 A1 2/2018 Burch
2022/0035943 A1 2/2022 Jones
2023/0252169 A1* 8/2023 Savir ..................... H04L 9/3247
726/26
2023/0308460 A1* 9/2023 Thomas ................ H04L 63/102

* cited by examiner

DEVICE PROTECTION USING PRE-EXECUTION COMMAND INTERCEPTION AND EVALUATION

FIELD

The field relates generally to information processing systems, and more particularly to the protection of such information processing systems.

BACKGROUND

Computing devices are typically configured to incorporate security functionality to protect such devices from malicious activity. For example, it may be desirable to prevent suspicious computer operations unless they are implemented by a legitimate and authorized user. Role-based access control (RBAC) techniques may be employed to restrict access to devices or network resources based on the roles of individual users within an organization. RBAC techniques typically allow users to access only the information and other resources needed for their jobs and prevent users from accessing additional resources. RBAC techniques, however, are vulnerable to various types of attacks, such as password theft and/or session hijacking.

A need exists for improved techniques for protecting devices from suspicious and/or unauthorized computer operations.

SUMMARY

In one embodiment, a method comprises obtaining, by a software entity associated with an operating system kernel of at least one processing device, at least one command from a user prior to an execution of the at least one command; providing, by the software entity associated with the operating system kernel, a request to at least one approval entity to evaluate whether to execute the at least one command; and initiating the execution of the at least one command based at least in part on a result of the evaluation, by the at least one approval entity, of whether to execute the at least one command.

In some embodiments, the at least one approval entity is identified by accessing a registry, associated with the at least one processing device, of one or more users that are authorized to provide an authorization to execute the at least one command. The evaluation, by the at least one approval entity, of whether to execute the at least one command may comprise one or more tasks specified by a policy. The initiating the execution of the at least one command may further comprise providing the at least one command to an operating system for execution.

In one or more embodiments, the software entity associated with the operating system kernel may determine whether the at least one command requires an authorization, prior to the execution of the at least one command, by the at least one approval entity. For example, the determining whether the at least one command requires the authorization may be based at least in part on a determination of whether the at least one command comprises a sensitive command.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for device protection using pre-execution command interception and evaluation.

In one or more embodiments, the disclosed pre-execution command interception techniques allow a user to submit a command for execution by a device. In at least some embodiments, the command is intercepted by a software entity associated with an operating system kernel of the device, prior to an execution of the command, and the command is only executed following an evaluation and approval by an approval entity, such as a different user.

Thus, in an embodiment, a user request to perform a command (e.g., a sensitive command, as discussed below) on a device is intercepted before the command is executed and an evaluation process is initiated, whereby the approval entity, such as another user, evaluates and potentially approves the execution of the command. The approval entity may determine whether the command should be executed, for example, in accordance with a policy. If the approval entity approves the execution of the command, a hold on the execution of the command by the operating system kernel is released and the execution of the command by the operating system may proceed.

Among other benefits, the disclosed techniques for device protection using pre-execution command interception and evaluation protects devices from unauthorized and/or malicious commands, such as attempts to: (i) perform an unauthorized encryption or deletion of one or more files; (ii) execute sensitive commands that may impair the operation of the device or the data of the device and/or (iii) suspend operation of a device. In addition, the pre-execution command interception and evaluation allows (i) the permission requirements associated with the command and/or (ii) the permissions of the user attempting to execute the command to be evaluated in real-time prior to the command execution. In this manner, the latest applicable rules and/or guidelines (collectively referred to herein as policies) for command execution can be evaluated before the command is executed.

Figure 1:
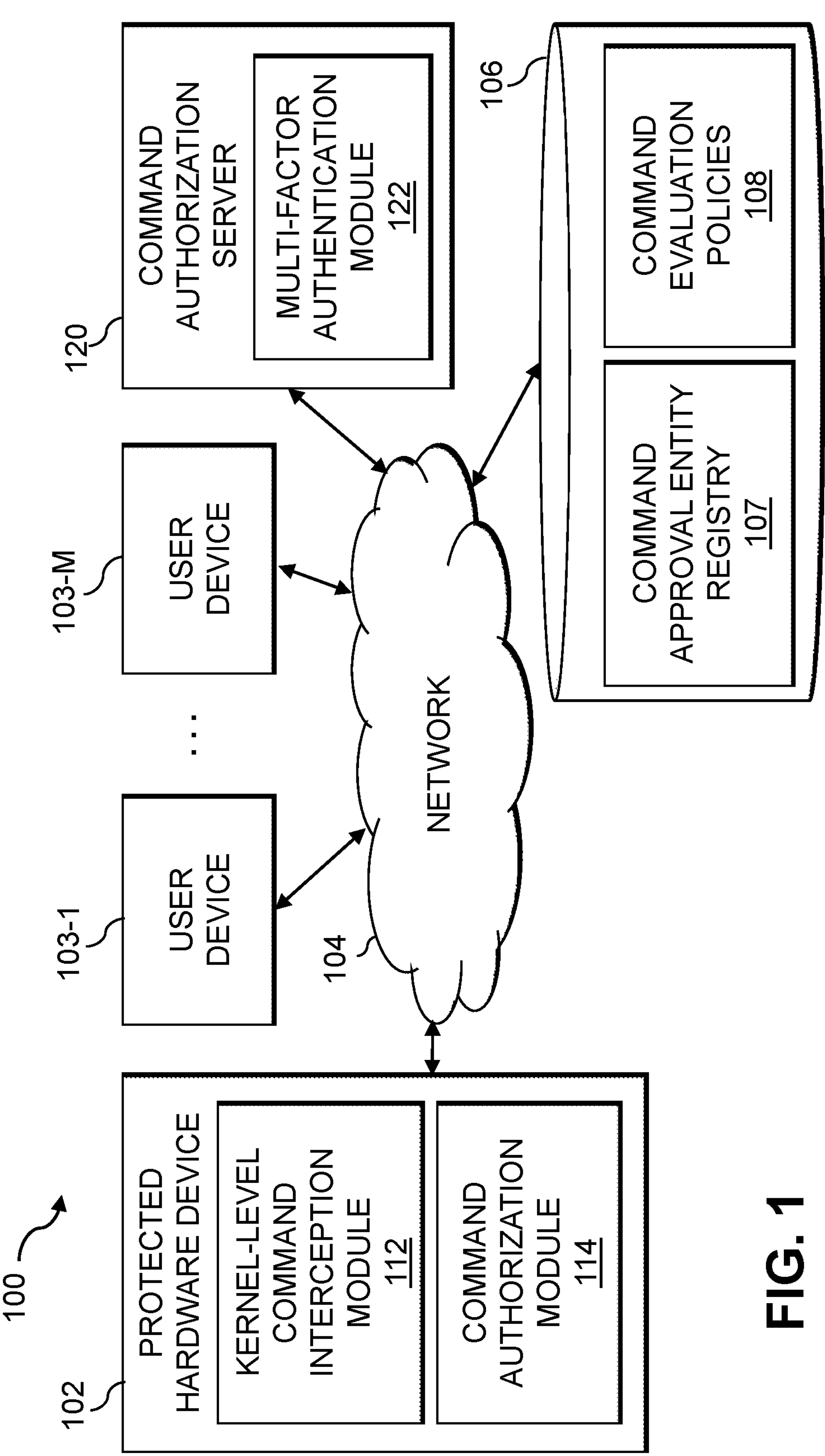
FIG. 1 illustrates an information processing system configured to protect devices using pre-execution command interception and evaluation in accordance with an illustrative embodiment.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more protected hardware devices 102, one or more command authorization servers 120 and one or more databases 106, discussed below.

The protected hardware devices 102 may comprise edge devices, host devices and other devices that execute user commands. One or more aspects of the disclosure recognize that edge devices, for example, are attractive targets for an attack and often comprise critical infrastructure that may require a pre-execution evaluation of whether to execute certain commands and/or operations. Edge devices may be stored, for example, in a physical location that may not be properly secured. An attacker may be able to access a perimeter of a location of the edge device (or another adjacent or nearby location that is within range of the edge device).

The user devices 103 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary protected hardware device 102 may comprise a kernel-level command interception module 112 and a command authorization module 114. In some embodiments, the kernel-level command interception module 112 automatically detects a user attempt to execute a command, as discussed further below in conjunction with FIGS. 4 through 6. The command authorization module 114 automatically requests an evaluation of an intercepted command by an approval entity, as discussed further below in conjunction with FIGS. 4 through 6, before the command is executed by the respective device. In addition, the command authorization module 114 may request that a multi-factor authentication module 122, discussed further below, of the command authorization server 120 perform a multi-factor authentication of one or more users and/or one or more approval entities before a given command can be executed.

It is to be appreciated that this particular arrangement of modules 112, 114 illustrated in the protected hardware device 102 of the FIG. 1 embodiment is presented by way of example only, and alternative arrangements can be used in other embodiments. For example, the functionality associated with modules 112, 114 in other embodiments can be combined into a single element, or separated across a larger number of elements. As another example, multiple distinct processors can be used to implement different ones of modules 112 and 114 or portions thereof.

At least portions of modules 112, 114 may be implemented at least in part in the form of software that is stored in memory and executed by a processor. An exemplary process utilizing modules 112, 114 of the protected hardware device 102 in computer network 100 will be described in more detail with reference to FIGS. 2 through 6.

Other protected hardware devices 102 (not shown in FIG. 1) are assumed to be configured in a manner similar to that shown for protected hardware device 102 in the figure.

The command authorization server 120 may be implemented, for example, on the cloud, such as a private cloud, or on the premises of an enterprise or another entity, as discussed further below in conjunction with FIG. 3. In some embodiments, the command authorization server 120, or portions thereof, may be implemented as part of a host device. As also depicted in FIG. 1, the command authorization server 120 further comprises a multi-factor authentication module 122. In some embodiments, the multi-factor authentication module 122 processes requests from, for example, the command authorization module 114 of one or more protected hardware devices 102 to perform a multi-factor authentication of one or more users and/or one or more approval entities.

It is to be appreciated that this particular arrangement of the multi-factor authentication module 122 illustrated in the command authorization server 120 of the FIG. 1 embodiment is presented by way of example only, and alternative arrangements can be used in other embodiments. For example, the functionality associated with multi-factor authentication module 122 in other embodiments can include additional modules, or be separated across a larger number of modules. As another example, multiple distinct processors can be used to implement different portions of multi-factor authentication module 122.

At least portions of multi-factor authentication module 122 may be implemented at least in part in the form of software that is stored in memory and executed by a processor. An exemplary process utilizing multi-factor authentication module 122 of an example command authorization server 120 in computer network 100 will be described in more detail with reference to the flow diagrams of, for example, FIGS. 4 through 6.

Additionally, the protected hardware device 102 and/or the command authorization server 120 can have an associated database 106 configured to store, for example, a command approval entity registry 107, a set of command evaluation policies 108, and/or information related to various monitored devices (not shown in FIG. 1), such as one or more protected hardware devices 102, such as device locations, network address assignments and performance data. The command approval entity registry 107 may identify, for example, one or more authorized entities to evaluate and approve the execution of one or more specific commands, command types and/or commands satisfying other command approval criteria. The command evaluation policies 108 may specify, for example, various guidelines, procedures and/or tasks for the evaluation by the approval entity of one or more commands, command types and/or commands satisfying other command approval criteria.

At least portions of the database 106 configured to store the command approval entity registry 107 and/or command evaluation policies 108 may be implemented, for example, using a vault provided by an operating system of one or more of the protected hardware devices 102, user devices 103 and/or command authorization servers 120.

In some embodiments, the commands requiring evaluation and approval by the approval entity may comprise sensitive commands. Such sensitive commands may be identified, for example, by evaluating one or more of: one or more sensitive commands identified, for example, in the database 106; one or more sensitive command properties identified, for example, in the database 106 and one or more sensitive command criteria identified, for example, in the database 106.

In one or more embodiments, one or more sensitive commands may have an associated automated evaluation process identified, for example, in database 106, that may be implemented in response to a request to evaluate whether a particular sensitive command should be allowed to execute.

Such sensitive commands may comprise, for example, one or more of the following commands: a user add command to create one or more users; a command to change a password for one or more user accounts; a change mode command that changes an access mode of a file; a super user do command that allows a permitted user, sometimes referred to as a super user, to execute a command on behalf of another user, as specified, for example, by a security policy; a super user command used to run a function as a different user; a yum command that allows users and system administrators to install, update, remove and/or search software packages on a system; an apt command for installing, updating, removing, and/or otherwise managing deb packages on Ubuntu, Debian, and related Linux distributions; a zipper command to specify a compression level; a user modification command to modify one or more existing user account details, such as a username, a password, a home directory location, and/or a default shell; a system control command for examining and controlling, for example, the service manager; and/or a system command to pass commands to the operating system.

The database 106 in the present embodiment is implemented using one or more storage systems associated with the command authorization server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more protected hardware devices 102, user devices 103 and/or command authorization servers 120 may be implemented on a common processing platform, or on separate processing platforms. The one or more protected hardware devices 102 and user devices 103 may be configured to interact over the network 104 in at least some embodiments with the command authorization server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more protected hardware devices 102, user devices 103 and/or command authorization servers 120 can be one or more input-output devices (not shown), which illustratively comprise keyboards, displays or other types of input-output devices in any combination. Such input-output devices can be used, for example, to support one or more user interfaces to the command authorization server 120, as well as to support communication between the command authorization server 120 and other related systems and devices not explicitly shown.

The one or more protected hardware devices 102, user devices 103 and/or command authorization servers 120 in the FIG. 1 embodiment are assumed to be implemented using at least one processing device. Each such processing device generally comprises at least one processor and an associated memory, and implements one or more functional modules for controlling certain features of the respective device.

More particularly, the one or more protected hardware devices 102, user devices 103 and/or command authorization servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more protected hardware devices 102, user devices 103 and/or command authorization servers 120 to communicate in some embodiments over the network 104 with each other (as well as one or more other networked devices), and illustratively comprises one or more conventional transceivers.

It is to be understood that the particular set of elements shown in FIG. 1 for device protection using pre-execution command interception and evaluation is presented by way of illustrative example only, and in other embodiments additional or alternative elements may be used. Thus, another embodiment includes additional or alternative systems, devices and other network entities, as well as different arrangements of modules and other components.

Figure 2:
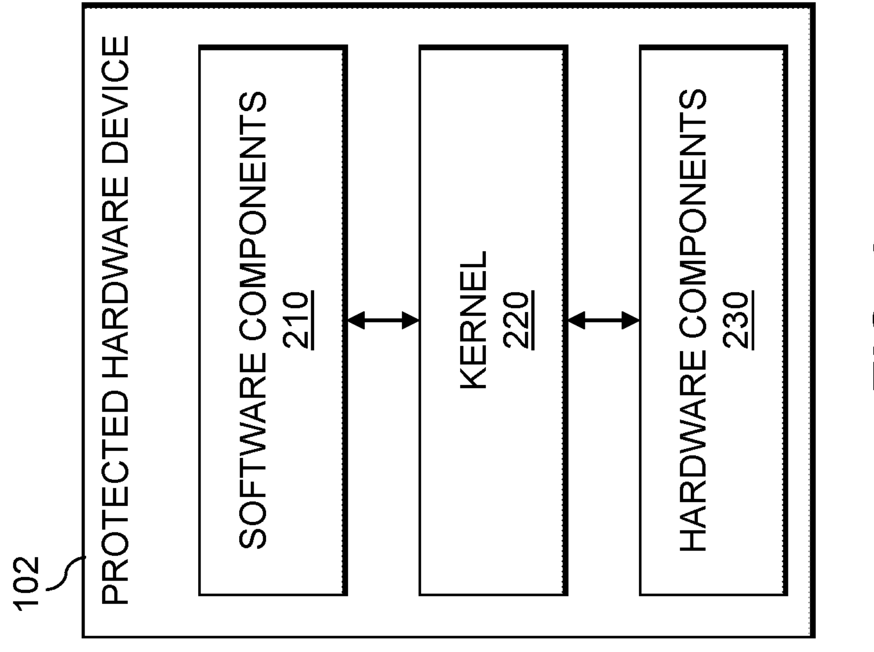
FIG. 2 illustrates the protected hardware device of FIG. 1 in further detail in accordance with an illustrative embodiment.

FIG. 2 illustrates the protected hardware device 102 of FIG. 1 in further detail in accordance with an illustrative embodiment. In the example of FIG. 2, the protected hardware device 102 comprises a kernel 220, resident in the memory of the protected hardware device 102, that provides an interface between software components 210 and hardware components 230.

As used herein, the term "kernel" shall be broadly construed to encompass any computer program that is part of an operating system of a protected hardware device 102 that enables interactions between such software components 210, such as applications, and the physical hardware components 230 of the protected hardware device 102. The hardware components 230 may comprise, for example, processing components, memory components, storage components and other hardware components.

In one or more embodiments, a software entity associated with the kernel 220 intercepts user commands, prior to the execution of such intercepted commands by the operating system of the protected hardware device 102, so that such intercepted user commands may be evaluated and potentially approved by an approval entity. The kernel 220 may hold such intercepted user commands during the evaluation, and only release such intercepted user commands for execution upon an approval from an authorized approval entity.

Figure 3:
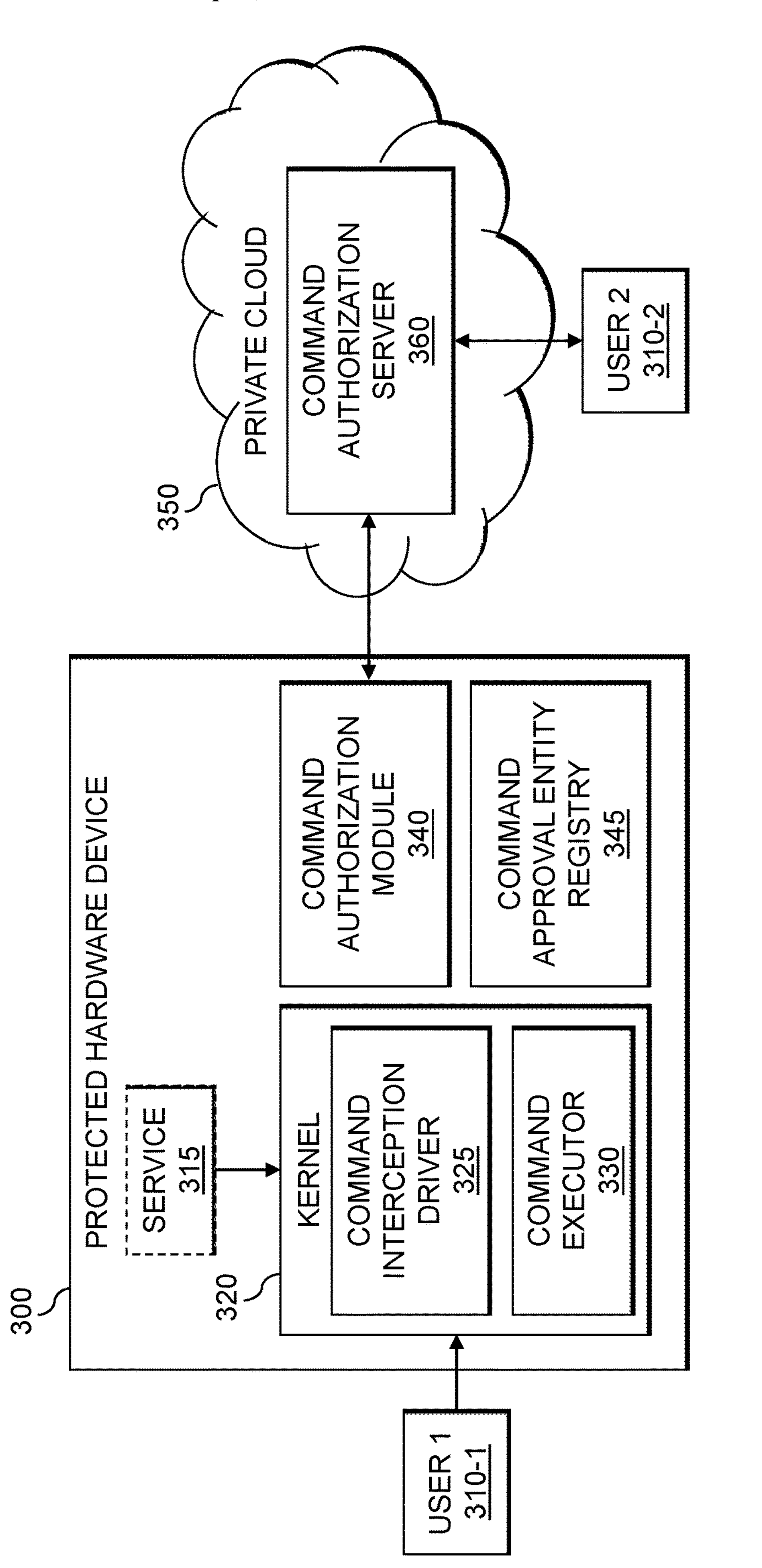
FIG. 3 illustrates an environment for device protection using pre-execution command interception and evaluation in accordance with an illustrative embodiment.

FIG. 3 illustrates an environment for device protection using pre-execution command interception and evaluation in accordance with an illustrative embodiment. In the example of FIG. 3, a first user 310-1 (or a service 315) submits a command for execution by a protected hardware device 300. The submitted command is intercepted by a command interception driver 325 of a kernel 320 of the protected hardware device 300. The command interception driver 325 determines if an evaluation and approval of the submitted command are required before the submitted command can be executed by a command executor 330. The command interception driver 325 may determine if the evaluation and approval of the submitted command are required, for example, by accessing and applying one or more policies from the command evaluation policies 108 of FIG. 1. The one or more policies may specify, for example, one or more specific commands, command types and/or other command criteria that require such evaluation and approval.

A command authorization module 340 may automatically request an evaluation by an approval entity of a command intercepted by the command interception driver 325, as discussed further below in conjunction with FIGS. 4 through 6, before the command is executed by the command executor 330. The command authorization module 340 may identify a particular authorized approval entity, such as a second user 310-2, for the intercepted command by accessing a command approval entity registry 345 that identifies, for example, one or more authorized entities to evaluate and approve the execution of one or more specific commands, command types and/or commands satisfying other command approval criteria. The command approval entity registry 345 may identify, for example, an identity and email address (or other contact mechanism) for each authorized approval entity.

The command authorization module 340 may send the request for evaluation to the identified approval entity, such as the second user 310-2, using a command authorization server 360. The command authorization server 360 may be implemented, for example, on the cloud, such as a private cloud 350, or on the premises of an enterprise or another entity.

In addition, the command authorization module 340 may optionally request that a multi-factor authentication module (not shown in FIG. 3), for example, of the command authorization server 360, perform a multi-factor authentication of one or more users that submit a command, such as the first user 310-1, and/or one or more approval entity users, such as the second user 310-2.

Figure 4:
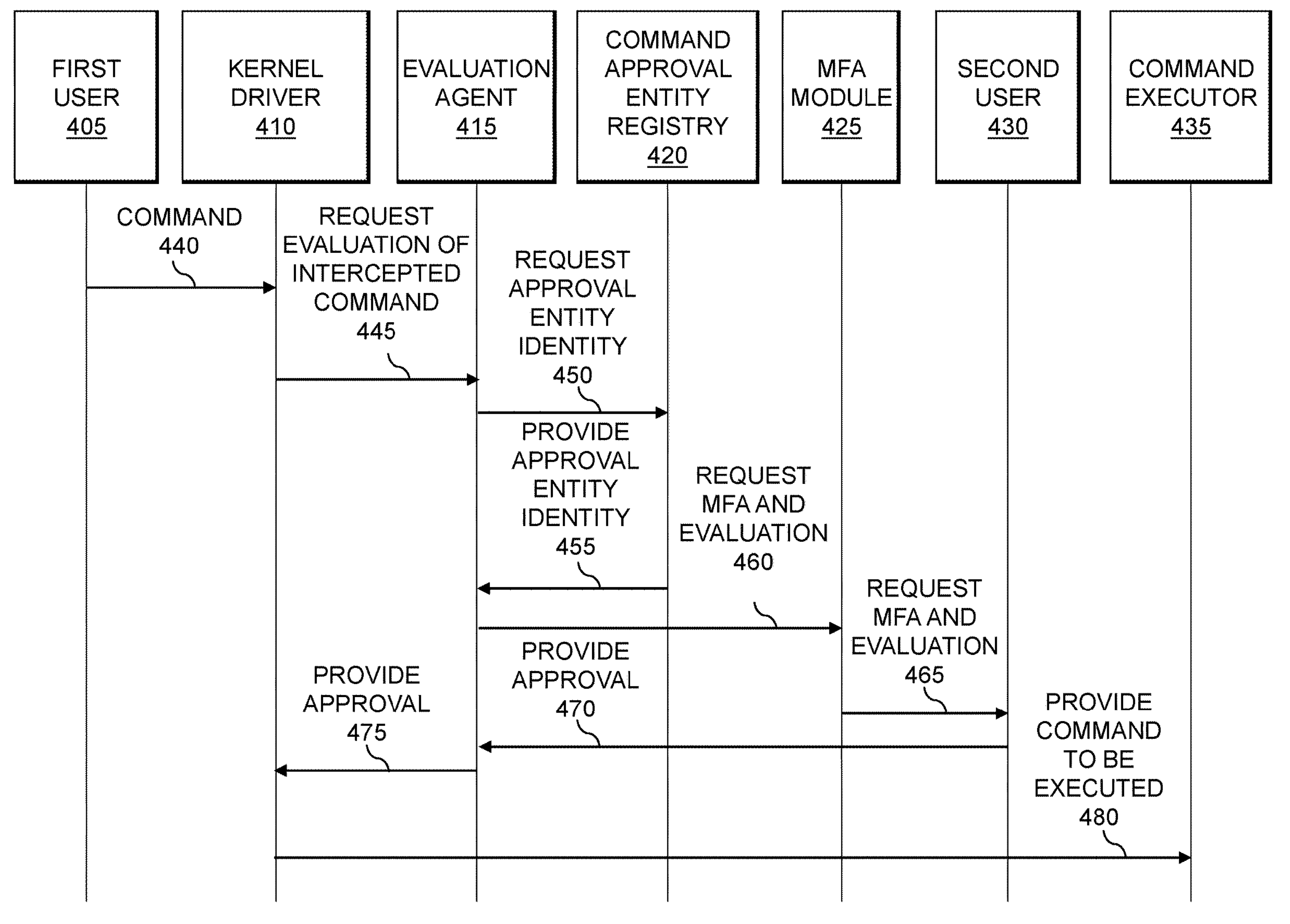
FIG. 4 is a communication diagram illustrating a process for device protection using pre-execution command interception and evaluation, according to one or more embodiments.

FIG. 4 is a communication diagram illustrating an exemplary process for device protection using pre-execution command interception and evaluation, according to one or more embodiments. In the example of FIG. 4, a first user 405 attempts to initiate a command 440 on a device. A kernel driver 410 of the device intercepts the command, and optionally determines if the command requires an evaluation before the command is executed. In at least some embodiments, the kernel driver 410 places a hold on the intercepted command while such an evaluation is performed.

The kernel driver 410 sends a request 445 for an evaluation of the intercepted command to an evaluation agent 415, such as the command authorization module 340 of FIG. 3. The evaluation agent 415 sends a request 450 to a command approval entity registry 420 to obtain the identity and contact information of an approval entity. The command approval entity registry 420 provides a response 455 to the evaluation agent 415 with the identity and contact information for the identified approval entity.

The evaluation agent 415 sends a request 460 to a multi-factor authentication (MFA) module 425, for example, for a multi-factor authentication of the identified approval entity and an evaluation of the intercepted command by the identified approval entity. The multi-factor authentication module 425 sends a request 465 to the identified approval entity, such as a second user 430, to complete a multi-factor authentication and evaluation of the intercepted command. In an embodiment where a multi-factor authentication of the identified approval entity is not required, the evaluation agent 415 may send the request 460 to another entity, such as the command authorization server 360 to serve as the intermediary with the identified approval entity.

The second user 430 performs the requested evaluation of the intercepted command, for example, in accordance with one or more guidelines, procedures and/or tasks for the evaluation specified in the command evaluation policies 108. Based on an outcome of the evaluation, the second user 430 may provide an approval 470 to execute the intercepted command to the evaluation agent 415, which, in turn, provides such an approval 475 to the kernel driver 410.

Upon receipt of the approval to execute the intercepted command, the kernel driver 410 will release the hold that was placed on the intercepted command and provide the command to be executed 480 to a command executor 435 for execution.

Figure 5:
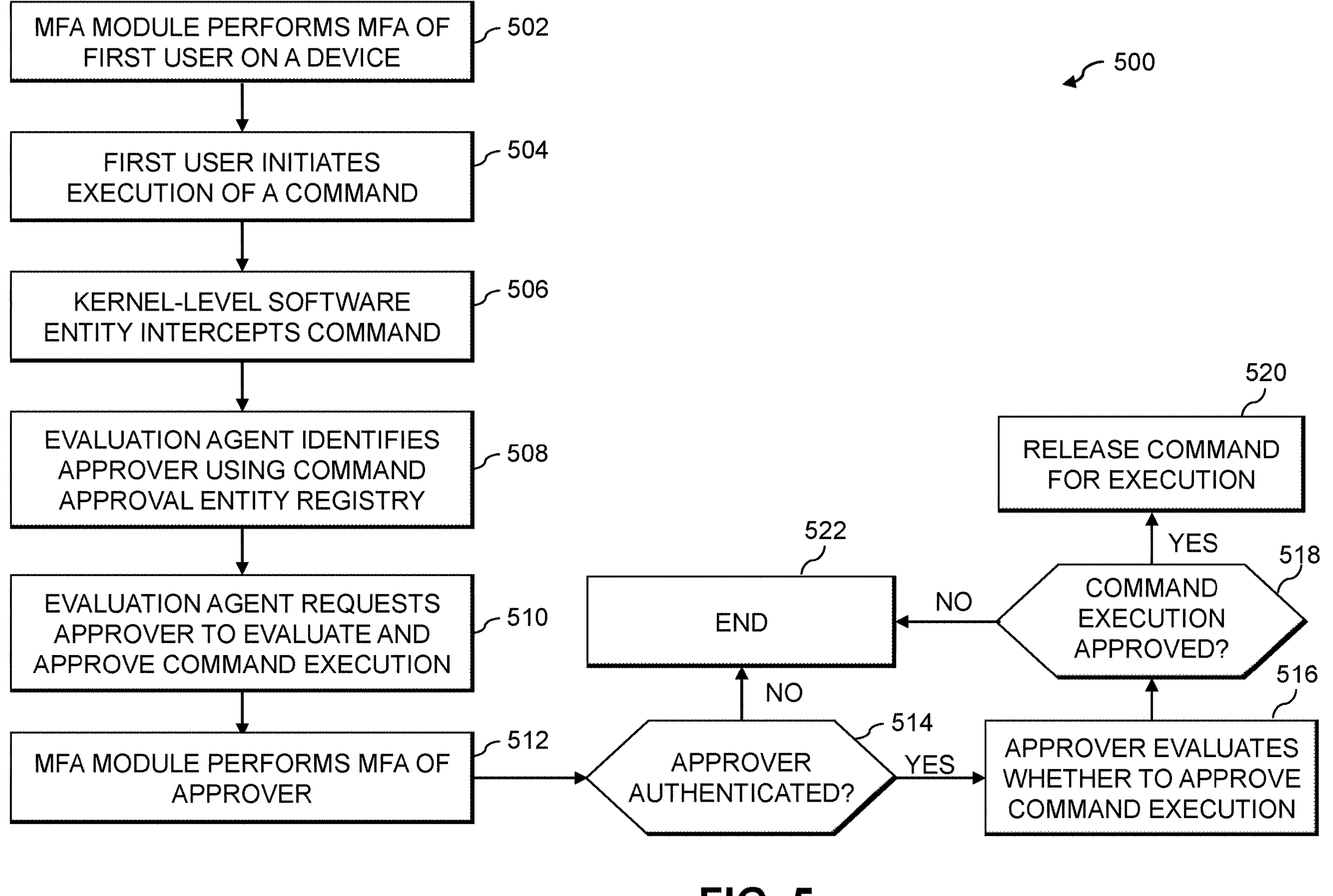
FIG. 5 is a flow chart illustrating an exemplary implementation of a process for protecting devices using pre-execution command interception and evaluation, according to one embodiment of the disclosure.

FIG. 5 is a flow chart illustrating an exemplary implementation of a process 500 for protecting devices using pre-execution command interception and evaluation, according to one embodiment of the disclosure. In the example of FIG. 5, the multi-factor authentication module initially performs a multi-factor authentication of a first user on a device in step 502. In step 504, the first user initiates an execution of a command on the device. A kernel-level software entity, such as the command interception driver 325, intercepts the command in step 506.

In step 508, an evaluation agent identifies an approver to evaluate the intercepted command using a command approval entity registry, such as the command approval entity registry 107. The evaluation agent requests the identified approver to evaluate and approve the command execution in step 510. A multi-factor authentication module may perform a multi-factor authentication of the identified approver in step 512.

A test is performed in step 514 to determine if the approver was successfully authenticated. If it is determined in step 514 that the approver was successfully authenticated, then the approver evaluates whether to approve an execution of the intercepted command in step 516.

A further test is performed in step 518 to determine if the command execution was approved by the approver. If it is determined in step 518 that the command execution was approved by the approver, then the command is released for execution in step 520.

If, however, it is determined in step 514 that the approver was not successfully authenticated, or if it is determined in step 518 that the command execution was not approved by the approver, then program control ends in step 522.

Figure 6:
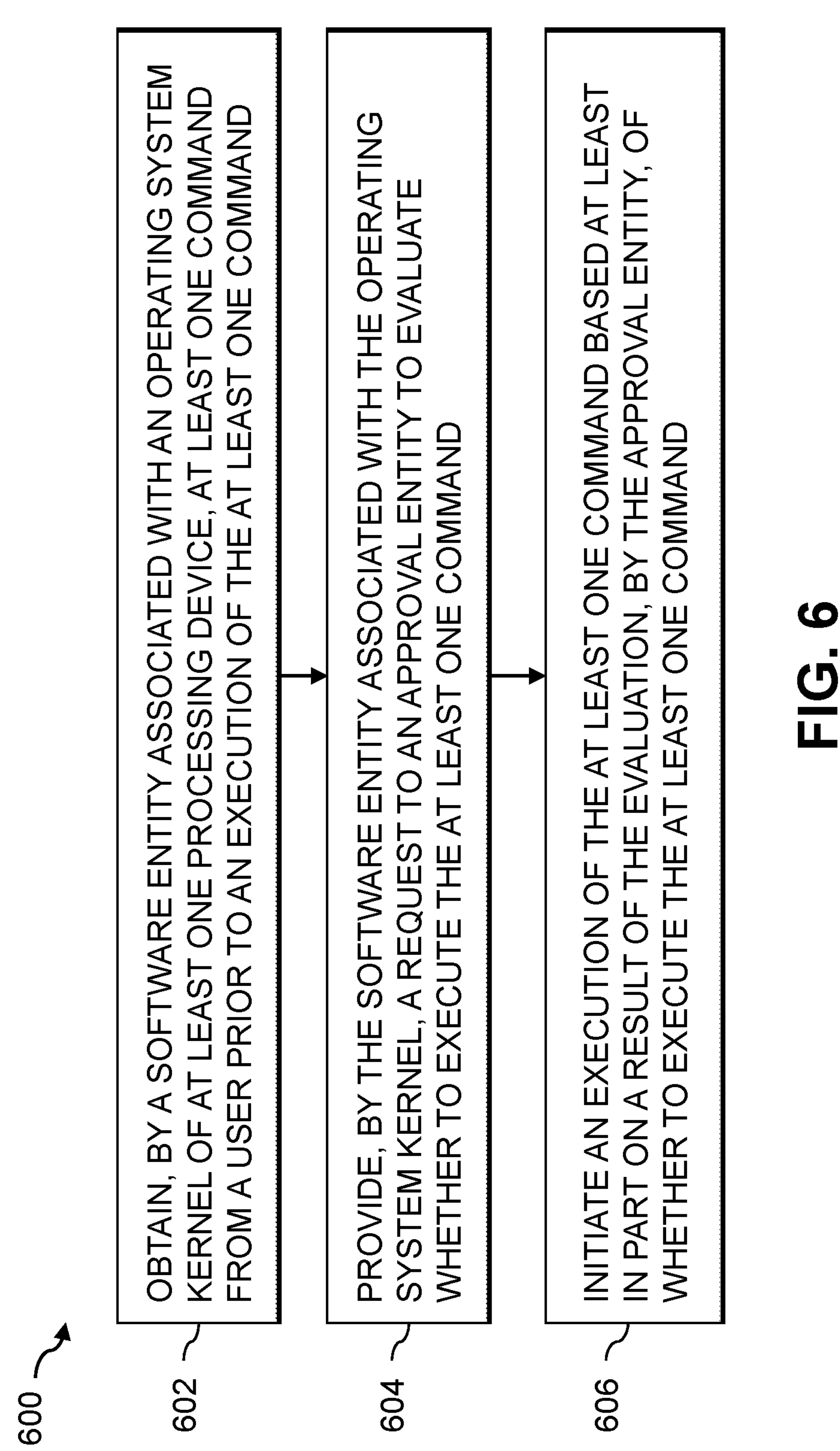
FIG. 6 is a flow chart illustrating an exemplary implementation of a process for device protection using pre-execution command interception and evaluation, according to one embodiment of the disclosure.

FIG. 6 is a flow chart illustrating an exemplary implementation of a process 600 for device protection using pre-execution command interception and evaluation, according to one embodiment of the disclosure. In the example of FIG. 6, the process 600 obtains, by a software entity associated with an operating system kernel of at least one processing device, at least one command from a user in step 602, prior to an execution of the at least one command.

In step 604, the process 600 provides, by the software entity associated with the operating system kernel, a request to at least one approval entity to evaluate whether to execute the at least one command.

In step 606, the process 600 initiates the execution of the at least one command based at least in part on a result of the evaluation, by the approval entity, of whether to execute the at least one command.

In one or more embodiments, the approval entity is identified by accessing a registry, associated with the at least one processing device, of one or more users that are authorized to provide an authorization to execute the at least one command. The evaluation, by the approval entity, of whether to execute the at least one command may comprise one or more tasks specified by a policy. The initiating the execution of the at least one command may further comprise providing the at least one command to an operating system for execution. A multi-factor authentication may be performed of the user and/or the approval entity.

In some embodiments, the software entity associated with the operating system kernel determines whether the at least one command requires an authorization, prior to the execution of the at least one command, by the approval entity. For example, the determining whether the at least one command requires the authorization may be based on a determination of whether the at least one command of at least one designated type. The determining whether the at least one command comprises the command of the at least one designated type evaluates: one or more command properties and/or one or more command criteria.

In at least one embodiment, the initiating the execution of the at least one command based at least in part on the result of the evaluation may further comprise initiating the execution of the at least one command when there is an affirmative evaluation result or another indication of an approval. Likewise, the execution of the at least one command may be prevented when there is a negative evaluation result or another indication of a denied approval. In some embodiments, the command may be automatically executed if a denial of approval is not received within a designated time period.

The particular processing operations and other network functionality described in conjunction with FIGS. 4 through 6, for example, are presented by way of illustrative example only, and should not be construed as limiting the scope of the disclosure in any way. Alternative embodiments can use other types of processing operations for device protection using pre-execution command interception and evaluation. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for device protection using pre-execution command interception and evaluation can be employed, for example, to monitor for unauthorized command execution and to mitigate a detected unauthorized request for command execution by automatically performing one or more actions to prevent an execution of the unauthorized command and/or to mitigate an impact of the unauthorized command execution.

One or more embodiments of the disclosure provide improved methods, apparatus and computer program products for device protection using pre-execution command interception and evaluation. The foregoing applications and associated embodiments should be considered as illustrative only, and numerous other embodiments can be configured using the techniques disclosed herein, in a wide variety of different applications.

It should also be understood that the disclosed pre-execution command interception and evaluation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for device protection using pre-execution command interception and evaluation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based command interception and evaluation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based command interception and evaluation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
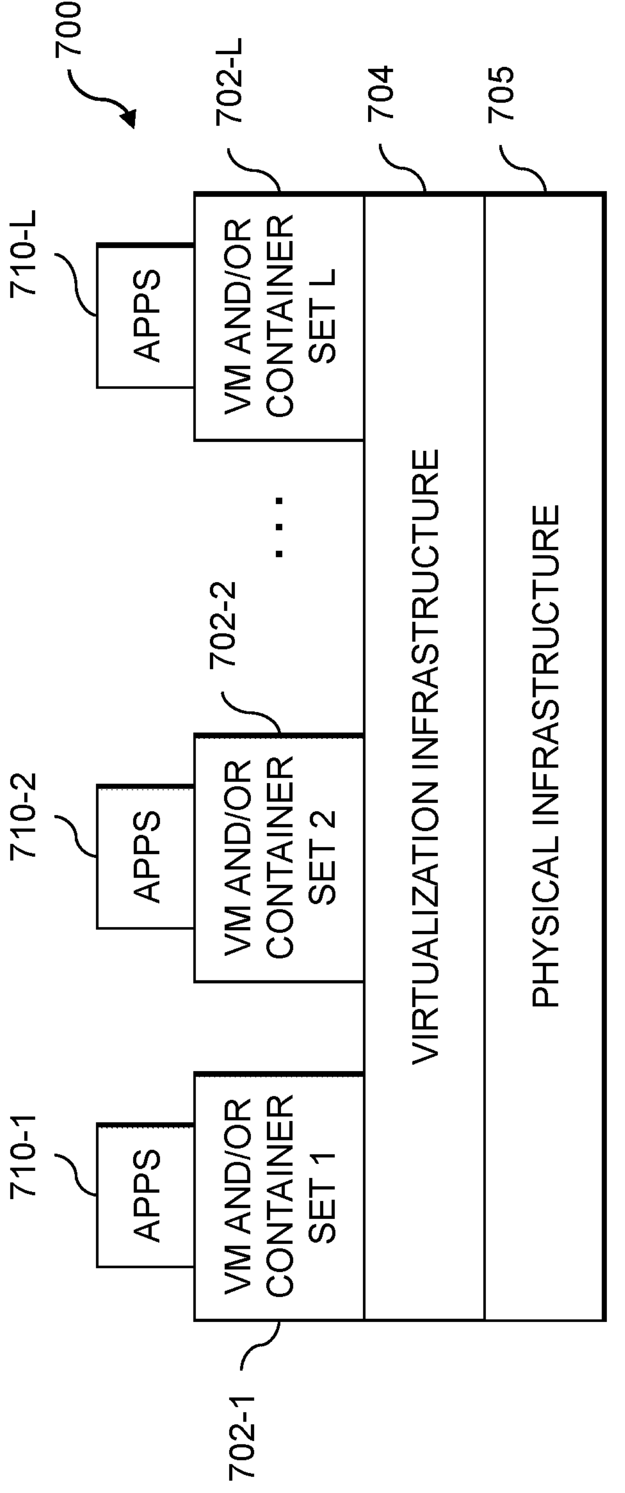
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide unauthorized command detection functionality of the type described above for one or more processes running on a given one of the VMs. For example, each of the VMs can implement unauthorized command detection control logic and associated mitigation functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide unauthorized command detection and mitigation functionality of the type described above for one or more processes running on different ones of the containers. For example, a container host device supporting multiple containers of one or more container sets can implement one or more instances of unauthorized command detection control logic and associated mitigation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
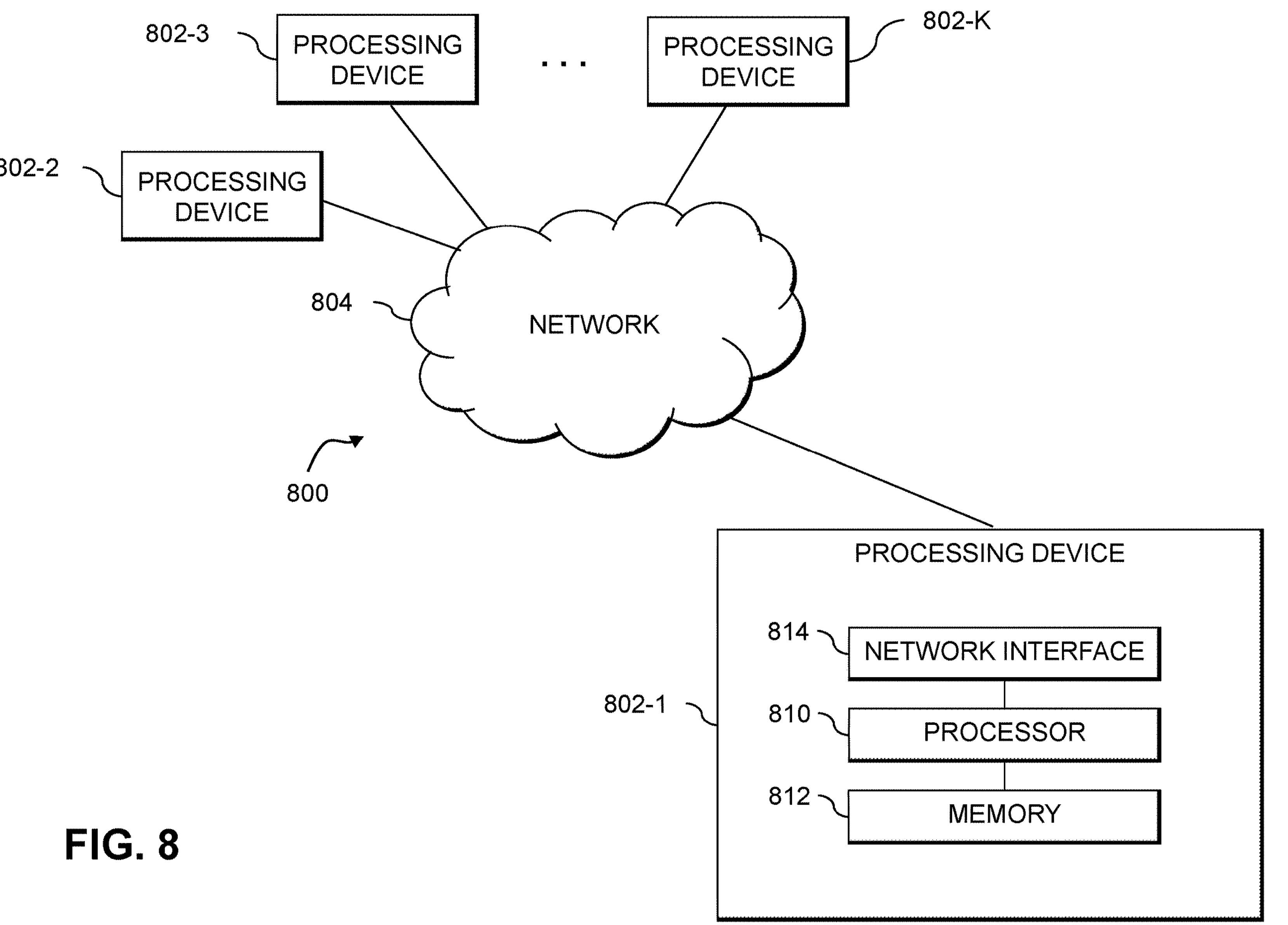
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining, by at least one software entity of an operating system kernel of at least one processing device comprising a processor coupled to a memory, one or more commands from a user prior to an execution of the one or more commands on the at least one processing device, wherein the obtaining comprises the at least one software entity of the operating system kernel intercepting the one or more commands on the at least one processing device, prior to the execution of the one or more commands, wherein the operating system kernel holds the intercepted one or more commands during an evaluation of the intercepted one or more commands;

providing, by the at least one software entity of the operating system kernel, in response to the one or more commands, an approval request to at least one approval entity to evaluate whether to execute the one or more commands, wherein the approval request requests the at least one approval entity to approve the execution of the one or more commands on the at least one processing device; and initiating the execution of the one or more commands based at least in part on a result of the evaluation, by the at least one approval entity, of whether to execute the intercepted one or more commands, wherein the operating system kernel releases the hold of the intercepted one or more commands for execution in response to the at least one approval entity approving the execution of the one or more commands on the at least one processing device;

wherein the method is performed by the at least one processing device.

2. The method of claim 1, wherein the at least one approval entity is identified by accessing a registry, associated with the at least one processing device, of one or more users that are authorized to provide an authorization to execute the one or more commands.

3. The method of claim 1, wherein the evaluation, by the at least one approval entity, of whether to execute the one or more commands comprises one or more tasks specified by a policy.

4. The method of claim 1, wherein the initiating the execution of the one or more commands further comprises providing the one or more commands to an operating system for execution.

5. The method of claim 1, further comprising performing a multi-factor authentication of one or more of the user and the at least one approval entity.

6. The method of claim 1, further comprising determining, by the at least one software entity associated with the operating system kernel, whether the one or more commands requires an authorization, prior to the execution of the one or more commands, by the at least one approval entity.

7. The method of claim 6, wherein the determining whether the one or more commands requires the authorization is based at least in part on a determination of whether the one or more commands comprises a command of at least one designated type.

8. The method of claim 7, wherein the determining whether the one or more commands comprises the command of the at least one designated type evaluates one or more of: one or more command properties and one or more command criteria.

9. An apparatus comprising:

at least one processing device comprising a processor coupled to a memory;

the at least one processing device being configured to implement the following steps:

obtaining, by at least one software entity of an operating system kernel of at least one processing device comprising a processor coupled to a memory, one or more commands from a user prior to an execution of the one or more commands on the at least one processing device, wherein the obtaining comprises the at least one software entity of the operating system kernel intercepting the one or more commands on the at least one processing device, prior to the execution of the one or more commands, wherein the operating system kernel holds the intercepted one or more commands during an evaluation of the intercepted one or more commands;

providing, by the at least one software entity of the operating system kernel, in response to the one or more commands, an approval request to at least one approval entity to evaluate whether to execute the one or more commands, wherein the approval request requests the at least one approval entity to approve the execution of the one or more commands on the at least one processing device; and initiating the execution of the one or more commands based at least in part on a result of the evaluation, by the at least one approval entity, of whether to execute the intercepted one or more commands, wherein the operating system kernel releases the hold of the intercepted one or more commands for execution in response to the at least one approval entity approving the execution of the one or more commands on the at least one processing device.

10. The apparatus of claim 9, wherein the at least one approval entity is identified by accessing a registry, associated with the at least one processing device, of one or more users that are authorized to provide an authorization to execute the one or more commands.

11. The apparatus of claim 9, wherein the evaluation, by the at least one approval entity, of whether to execute the one or more commands comprises one or more tasks specified by a policy.

12. The apparatus of claim 9, wherein the initiating the execution of the one or more commands further comprises providing the one or more commands to an operating system for execution.

13. The apparatus of claim 9, further comprising determining, by the at least one software entity associated with the operating system kernel, whether the one or more commands requires an authorization, prior to the execution of the one or more commands, by the at least one approval entity.

14. The apparatus of claim 13, wherein the determining whether the one or more commands requires the authorization is based at least in part on a determination of whether the one or more commands comprises a command of at least one designated type.

15. The apparatus of claim 14, wherein the determining whether the one or more commands comprises the command of the at least one designated type evaluates one or more of: one or more command properties and one or more command criteria.

16. A non-transitory processor-readable storage medium having stored therein program code of one or more software programs, wherein the program code when executed by at least one processing device causes the at least one processing device to perform the following steps:

obtaining, by at least one software entity of an operating system kernel of at least one processing device comprising a processor coupled to a memory, one or more commands from a user prior to an execution of the one or more commands on the at least one processing device, wherein the obtaining comprises the at least one software entity of the operating system kernel intercepting the one or more commands on the at least one processing device, prior to the execution of the one or more commands, wherein the operating system kernel holds the intercepted one or more commands during an evaluation of the intercepted one or more commands;

providing, by the at least one software entity of the operating system kernel, in response to the one or more commands, an approval request to at least one approval entity to evaluate whether to execute the one or more commands, wherein the approval request requests the at least one approval entity to approve the execution of the one or more commands on the at least one processing device; and initiating the execution of the one or more commands based at least in part on a result of the evaluation, by the at least one approval entity, of whether to execute the intercepted one or more commands, wherein the operating system kernel releases the hold of the intercepted one or more commands for execution in response to the at least one approval entity approving the execution of the one or more commands on the at least one processing device.

17. The non-transitory processor-readable storage medium of claim 16, wherein the at least one approval entity is identified by accessing a registry, associated with the at least one processing device, of one or more users that are authorized to provide an authorization to execute the one or more commands.

18. The non-transitory processor-readable storage medium of claim 16, wherein the evaluation, by the at least one approval entity, of whether to execute the one or more commands comprises one or more tasks specified by a policy.

19. The non-transitory processor-readable storage medium of claim 16, wherein the initiating the execution of the one or more commands further comprises providing the one or more commands to an operating system for execution.

20. The non-transitory processor-readable storage medium of claim 16, further comprising determining, by the at least one software entity associated with the operating system kernel, whether the one or more commands requires an authorization, prior to the execution of the one or more commands, by the at least one approval entity.

* * * * *